Figure 1:
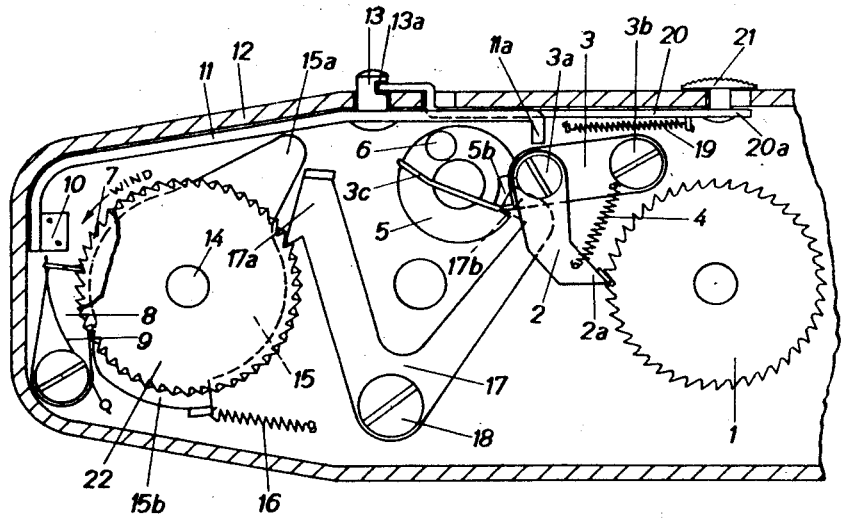

May 7, 1957  K. BAMMESBERGER ET AL  2,791,163
ROLL FILM CAMERA ADJUSTMENT MECHANISM
Filed March 20, 1953

INVENTORS
KARL BAMMESBERGER
WILLY KADEN

By Connolly and Hutz

THEIR ATTORNEYS

2,791,163

ROLL FILM CAMERA ADJUSTMENT MECHANISM

Karl Bammesberger, Munich-Untermenzing, and Willy Kaden, Munich, Germany, assignors to AFGA Camera-Werk Aktiengesellschaft, Munich, Germany, a corporation of Germany Application March 20, 1953, Serial No. 343,738

Claims priority, application Germany April 17, 1952

7 Claims. (Cl. 95—31)

The present invention relates to a roll film camera provided with a rewind block and a pre-setting device for the counter mechanism, wherein the counting disc is driven in the known manner by means of the film strip. In particular, the invention relates to manually operable control means for selectively setting the counter by a simple manipulation action.

It has long been a problem in roll film cameras, particularly movie cameras of minature size, to provide a means for manually adjusting the film frame counter without also rendering the same unreliable and susceptible to easy unintended actuation. Because of this difficulty, such devices are usually located with other adjustment means within a separate covered enclosure below the upper camera covering plate and necessitate many extra transmission parts for connecting the same with the actual counter mechanism.

The present invention proposes to overcome the above noted difficulties by mounting the counter adjusting means in an exposed position. In order to prevent an unintended actuation of these adjusting means in such a case and nevertheless to make possible an easy setting of the counting disc, it is suggested according to the present invention to arrange a manually operable member which simultaneously controls both the counter and the rewind blocking device, and which is protected against unintended actuation. For this purpose a bow-like lever is attached by means of a spring at the inner wall of the upper part of the camera, and is so arranged within the reach of a lever controlling the rewind blocking device and a link actuating the counting disc, that by swinging it out of its normal position it releases the rewind blocking device and actuates the setting device for the counting disc. Preferably the lever which controls the rewind-blocking device is rotatably arranged about the axis of the blocking wheel of the rewind blocking device and is provided with a cam projection for freeing the rewind blocking device. A return spring is attached to the lever and tends to hold the lever in an initial non-operative position which does not influence the blocking action.

The free end of the resilient bow is so arranged that the setting device for the counting disc can be actuated independently of rotating the measuring disc. The resilient bow is connected with a pressure touching member or button placed for easy access on the exterior of the camera. In order to protect the button against unintended actuation, it is provided with a cut-out portion into which a blocking slide or latch is normally held under the action of a spring. A further blocking lever is arranged for unmobilizing the film transport and for driving a double exposure blocking device in such a manner that said rewind blocking control lever frees the film transport device upon actuation of the resilient bow member.

Figure 2:
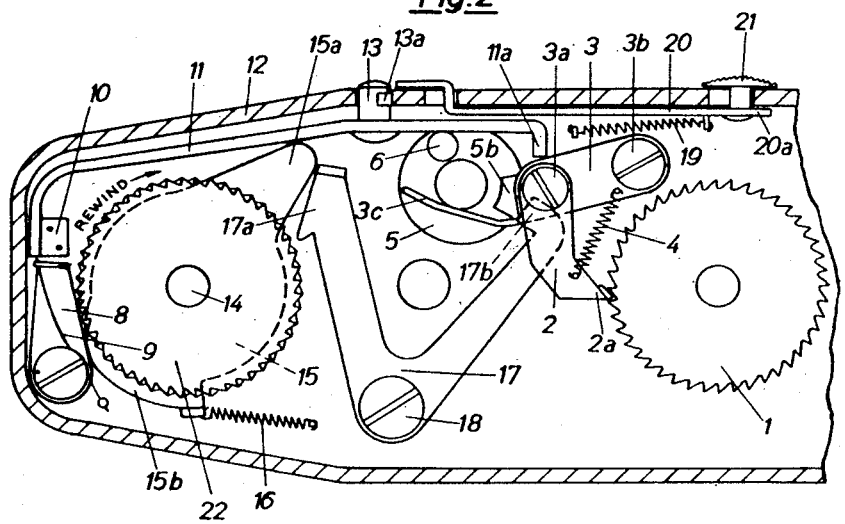

Having broadly described the invention reference will now be made to a specific embodiment of the same in cooperation with the accompanying drawings, and in which:

Fig. 1 is a partial section view through a conventional roll film camera illustrating the various working parts in elevation, and Fig. 2 is a partial section view similar to Fig. 1 illustrating the parts in a different operative relationship.

As illustrated in Fig. 1 the camera includes a counting device with a ratchet wheel or counting disc 1 and a pawl 2 for moving the latter in a step-by-step manner. The pawl 2 being arranged to pivot on a lever 3 about an arbor or pin 3a. The end 2a of the pawl is connected with the lever 3 by means of a tension spring 4 which tends to pivot the pawl in a counterclockwise direction as viewed. Lever 3 is rotatably mounted on a second pin 3b and possesses an extended finger portion 3c which projects within reach of a peg 6 carried by a measuring disc 5. The measuring disc 5, which is rotatably mounted in the camera wall, possesses a single ratchet 5b and is driven in a known manner by movement of the film strip (not illustrated) during operation of the camera. The arrangement is so constructed that a single rotation of measuring disc 5 will cause the peg 6 corresponding to a film exposure section to come within reach of the lever arm 3c and thereby causes swinging of lever 3 downwardly, as viewed in Fig. 2, to rotate the counting disc 1 ahead (counterclockwise) by the extent of one tooth.

7 represents a second ratchet wheel which is connected with the unwinding spool for the film strip (neither of which is illustrated), and as is customary, is normally locked against rewinding of the exposed film strip by means of a brake pawl 8 which is normally biased into engagement with the toothed blocking wheel 7 by a spring 9.

Ratchet wheel 7 is firmly connected with the unwinding or take-up spool axle 14 and is positioned thereon between a second ratchet wheel 22 (see Figs. 1 and 2), which is also firmly connected for rotation with the unwinding spool, and a camming arm 15a which is rotatably mounted on axle 14 and biased by a spring 16 connected to a cam-like extension 15b of the camming arm to normally cause it to pivot about axle 14 in a counter-clockwise direction. The cam portion 15 acts to disengage brake pawl 8 from ratchet wheel 7 to allow a rewind rotation of the unwinding spool when arm 15 is moved against the bias of spring 16 in a clockwise direction. Arm 15 also includes a second extension 15a lying substantially opposite the cam portion 15b and which is adapted to cooperate with a double arm lever 17, comprising part of the conventional double exposure blocking mechanism, to pivot the double armed lever about an arbor 18 in a clockwise direction for a purpose hereinafter apparent.

Lever 17 includes an extended arm 17a having a nose portion which is adapted to engage the ratchet wheel 22 and to block rotation of the wheel axle 14, the unwinding spool and ratchet wheel 7 in a counterclockwise direction. Lever 17 also includes a second angularly extended arm including a nose portion 17b, which is adapted to normally project into the rut or cleft 5b in measuring disc 5, and to block the disc from rotation. The two arms 17a and 17b of lever 17 are so related with respect to each other about the common pivot axle 18 as to be optionally engageable with disc 5 and wheel 22 in such manner that in one limit position (shown in Fig. 1) the nose area 17a engages ratchet wheel 22 and prevents movement of the unwinding or take-up spool, while at the same time nose area 17b fully engages notch 5b in disc 5 to block rotation of the disc. In its other limit position (see Fig. 2), arm 17a becomes disengaged from ratchet wheel 22, the latter being held from a reverse movement by the engagement of breaking pawl 8 with ratchet wheel 7 until cam 15b releases it, and nose area 17b becomes disengaged from notch 5b to permit the spool and disc 5 to rotate under the influence of the film movement in the manner previously described.

It will thus be apparent that the V-shaped lever 17 comprises a double exposure blocking device in which the transporting of the film and the release of the shutter are in the usual manner alternately blocked, the film transportation being controlled via ratchet wheel 22 and nose area 17a and the shutter release being controlled by lever 17, nose area 17b, disc 5, pawl 2 and counting wheel 1 in a manner well known in the art.

In order to exert a supervisory control over the double exposure blocking device and the counting mechanism the camera is provided with an exposed manually operable push button 13 which is adapted to control the counting and rewind blocking mechanism. As shown in the drawings, the button 13 projects into the camera casing through wall 12 where it is firmly affixed to a bow-like lever member 11, of a resilient nature. Bow 11 is mounted at one end to the camera wall by a bracket 10 and includes a turned down extension or free end 11a positioned normally directly over the pawl mechanism 2, 3 for the counting disc 1. It will thus be apparent that actuation of push button 13 will cause bow 11 to move downwardly into the camera unit until it engages the extended tip of lever arm 15a and pawl lever 3 (see Fig. 2). Upon release of the button 13, the resilient nature of the bow causes it to return to the initial position shown in Fig. 1.

In order to prevent unintended actuation of the push button, it is provided with a cut-out portion 13a forming a locking groove for a latch bar 20 normally urged to engage the button by a spring 19. Bar 20 includes a control knob or button 21 projecting through the camera wall within an elongated slot at the other end of the bar 20a. Bar 20 normally prevents depression of push button 13, until and unless knob 21 is moved to retract the same from groove 13a. Any suitable means may be provided to retain bar 20 in the retracted position.

From the above described arrangement there results the following operation. By sliding and then holding control knob or button 21 against the action of the spring 19, the blocking side 20 is moved out of engagement with the push button 13. Then, by pressing down button 13, the resilient bow 11 is swung from its normal position shown in Fig. 1 into the position illustrated in Fig. 2. Thereby, its free end 11a bears against the pawl and swings the lever 3 into the position illustrated in Fig. 2 so that the counting wheel 1 is rotated to the extent of the single tooth. One thus is enabled, independently of the usual further automatic movement of the counting wheel 1, by means of repeated pressing down of the touch member 13 to move ahead the counting wheel by as many teeth as desired, or also set it for the initial number after exposure of an entire film strip. After a setting has once been made, it cannot unintentionally be changed because the latch bar 20 protects the resilient bow 11 from unintended actuation out of its initial position through engagement of the bar tip in the cut-out portion 13a.

If one desires to rewind the exposed film strip, then not only the rewind blocking device 7, 8, 9 must be released, but also the transport blocking device 5b, 17b for the film strip. For this purpose the bow 11 is so arranged (see Fig. 2) that upon being swung downwardly by depression of touch member 13, it strikes against the lever arm 15a and swings the lever against the effect of the spring 16 to cause cam projection 15b to abut pawl 8 and move it out of engagement with the blocking wheel 7. Simultaneously the lever arm 15a strikes against the nose 17a of lever 17 so that the transport blocking device, via ratchet wheel 22, is also released.

It will be appreciated that this form of control mechanism eliminates many of the extra parts necessary for accomplishing the same result in contemporary camera constructions. It will further be appreciated that the present arrangement also permits the adjustment of the counter mechanism to be fool-proof operation at any time in the progress of the picture taking operation.

As many apparently widely different embodiments of this invention may be made without departing from the spirit and scope hereof, it is to be understood that the invention is not limited to the specific embodiments hereof except as defined in the appended claims.

What is claimed is:

1. In a roll film camera provided with a casing, a braking device for preventing movement of a take-up spool in the rewind direction and a counter mechanism indicating movement of the number of frames in said film roll, the improvement comprising a manually operable push button projecting through the casing of said camera, said counter mechanism including a counting disc and means for moving said counting disc, measuring means engaged with said film and operatively associated with said counting disc moving means for moving said counting disc one digit per frame of film, lever means connected with said push button within said casing and positioned to simultaneously release said braking device to allow said take-up spool to move in the rewind direction and to actuate said counting disc moving means independent of movement of said measuring means to drive said counting disc to move one digit each time said push button is depressed, and latch means cooperating with said push button and normally operative to prevent depression of the latter.

2. In a roll film camera as set forth in claim 1, the improvement further comprising manually operative means projecting without said camera casing and connected to said latch means for permitting manual release of said latch means to thereby render said push button ready for manual depression.

3. A roll film camera including a casing, means for braking movement of a take-up spool in the rewind direction, a counter mechanism for indicating the frame movement of the roll film, step-by-step means for advancing said counter mechanism one digit at a time per movement of a frame of said roll film, measuring means engaged with said roll film and operatively associated with said step-by-step means for actuating said step-by-step means in accordance with movement of said film, a manual push button control means positioned without said camera casing for simultaneously operatively releasing said braking means and actuating said step-by-step means independent of movement of said film to advance said counter mechanism one digit ahead each time said push button is depressed, and a linkage disposed within said casing which operatively couples said manual push button control means with said braking means and said step-by-step means.

4. A roll film camera as set forth in claim 3 wherein said measuring means is comprised of a measuring disc mechanism adapted to be engaged with the roll film of the camera during its winding movement from a storage spool to said take-up spool and to be rotated synchronously thereby, said measuring disc including means for actuating said step-by-step means periodically in predetermined relationship to the winding of said roll film, and the control of said step-by-step means by said manual push button control means and said measuring disc being selectively independent of each other.

5. A roll film camera as set forth in claim 4 wherein said step-by-step means is comprised of a counting ratchet wheel and a pawl, and wherein said measuring means is comprised of a notched disc including a pin which periodically strikes said pawl.

6. A roll film camera as set forth in claim 5 further including a double armed lever pivoted intermediate said braking device and said counter mechanism, a blocking device for preventing movement of said take-up spool in the wind direction and said double armed lever having one arm projecting into the path of movement of said blocking device and being operatively associated therewith to block rotation of said take-up spool in the wind direction and a second arm for cooperating with said notched measuring disc to block rotation of said measuring disc.

7. A roll film camera according to claim 6 in which said braking and blocking devices include ratchets for controlling movement of said take-up spool, said braking device includes a pawl operatively engaged with said braking ratchet, a camming lever being coaxially mounted with said ratchets and having arms operatively associated with said braking pawl and said double armed lever, said linkage operatively coupling said push button with said braking means and said step-by-step means being operative in one limit position to contact said camming lever which disengages said braking pawl and rotates said double armed lever from its initial spool blocking and measuring disc blocking position to an alternate position in which it frees said spool and disc for movement upon actuation of said push button control means.

References Cited in the file of this patent

UNITED STATES PATENTS

| | | |
|---|---|---|
| 1,535,930 | MacDonald | Apr. 28, 1925 |
| 1,997,333 | Huttquist | Apr. 9, 1935 |
| 2,289,827 | Crumrine | July 14, 1942 |
| 2,345,999 | Babcock | Apr. 4, 1944 |
| 2,398,412 | Crumrine | Apr. 16, 1946 |
| 2,402,149 | Crumrine | June 18, 1946 |
| 2,539,764 | Wisegarver | Jan. 30, 1951 |
| 2,577,160 | Simmon | Dec. 4, 1951 |

FOREIGN PATENTS

| | | |
|---|---|---|
| 754,014 | Germany | Oct. 27, 1951 |